United States Patent [19]

Davis

[11] Patent Number: 5,149,172
[45] Date of Patent: Sep. 22, 1992

[54] CHILD SAFETY SEAT

[76] Inventor: Parry Davis, 1, The Paddock, Eaglesfield, Hartford, Northwich Cheshire CW8 1NQ, England

[21] Appl. No.: 557,045

[22] Filed: Jul. 25, 1990

[30] Foreign Application Priority Data

Jul. 27, 1989 [GB] United Kingdom ............ 8917133

[51] Int. Cl.[5] .................................. A47D 1/10
[52] U.S. Cl. ........................ 297/250; 297/284.9; 297/DIG. 3
[58] Field of Search ............ 297/250, DIG. 3, 485, 297/338, 284

[56] References Cited

U.S. PATENT DOCUMENTS

| | | | |
|---|---|---|---|
| 2,607,400 | 8/1952 | Witz | 297/284 X |
| 4,462,635 | 7/1984 | Lance | 297/284 |
| 4,601,667 | 7/1986 | Hull | 297/250 X |
| 4,687,452 | 8/1987 | Hull | 297/250 X |
| 4,759,588 | 7/1988 | Husnik | 297/250 X |
| 4,836,605 | 6/1989 | Greenwood et al. | 297/250 |

FOREIGN PATENT DOCUMENTS

| | | | |
|---|---|---|---|
| 3544041 | 6/1987 | Fed. Rep. of Germany. | |
| 1285552 | 8/1972 | United Kingdom | 297/DIG. 3 |

Primary Examiner—Peter A. Aschenbrenner
Attorney, Agent, or Firm—Browdy and Neimark

[57] ABSTRACT

A child safety seat which can be mounted on a chair having a seat and a backrest comprises a seat portion which engages the chair seat and includes a child engaging seat part and elongated lateral restraints at the sides of the seat part which extend from front to rear of the seat part. Adjustable length strap means connect at respective opposite ends to the restraints so that adjustment of the strap means effects mutual counter rotation of the restraints to vary the height of the seat part. The safety seat can also be provided with a backrest part which incudes lateral restraints along opposite upright sides thereof. A child safety harness is attached to the safety seat and straps are provided to secure the parts of the seat to the chair seat and backrest. The safety seat is of inflatable form.

20 Claims, 2 Drawing Sheets

CHILD SAFETY SEAT

This invention relates to child safety seats and has forts object the provision of such a seat of adjustable seat height.

The present intention consists in a child safety seat for mounting on a chair having a seat and a backrest, comprising a seat portion which in the mounted position of said safety seat engages said seat of said chair, said seat portion including a child engaging seat part and respective elongated lateral restraints extending along and secured to opposite sides of said seat disposed in a direction from front to rear thereof, there being provided adjustable length strap means connected at respective opposite ends to said restraints whereby adjustment of the length of said strap means effects mutual counter rotation of said restrains to vary the height of said child engaging seat part. Advantageously, said strap means, in use, extend beneath the seat portion.

Preferably, said restrain are each of tubular form and desirably of inflatable tubular form. Said child engaging seat part is also, advantageously, of inflatable form. Additional strap means are further provided to secure said seat part to said chair seat.

In a further form said child safety seat is provide with a backrest part which in the mounted position of said sheets engages said chair backrest. Suitably said backrest part includes respective elongated lateral restraints which extend along and are secured to opposite upright sides of said backrest part. Advantageously said said lateral restraints of said backrest are of tubular form. Preferably said lateral backrest restrains are of tuber inflatable form. Also said backrest part between said backrest lateral restrains is advantageously of inflatable form.

It will be understood that a child restraining harness is normally provided with a child safety seat according to this invention.

The invention will now be described, by way of example, with reference to the accompanying drawings in which.

Figure 1:
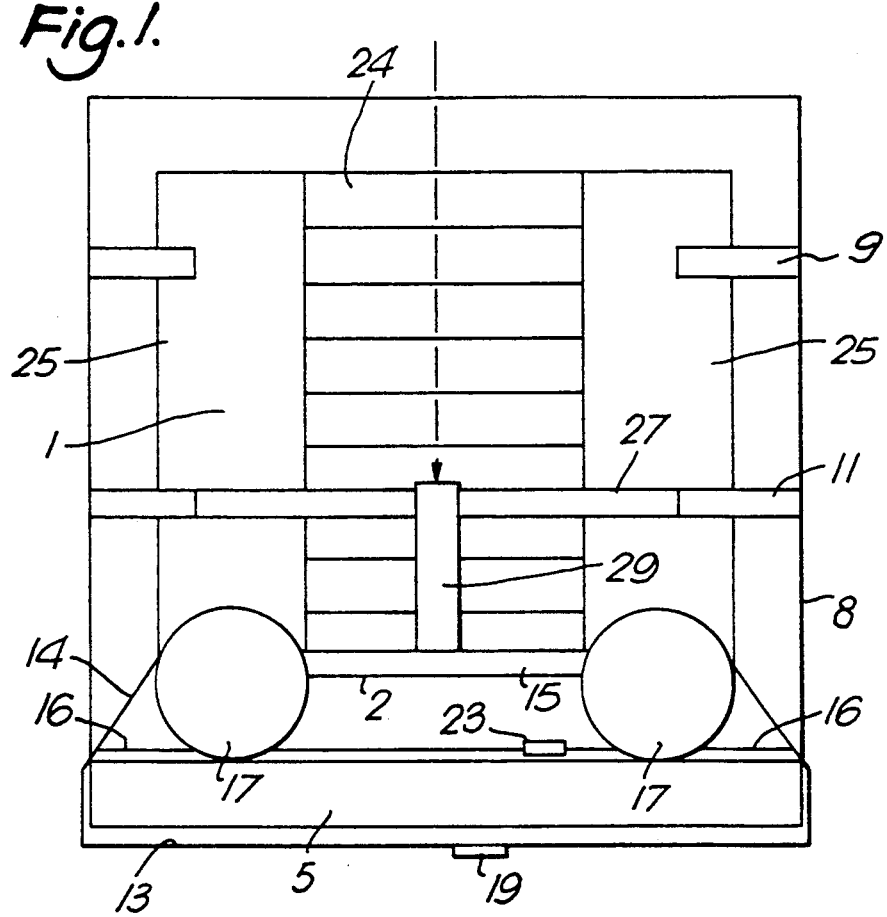
FIG. 1 is a front elevation of a child safety seat according to the invention mounted on a chair.
Figure 2:
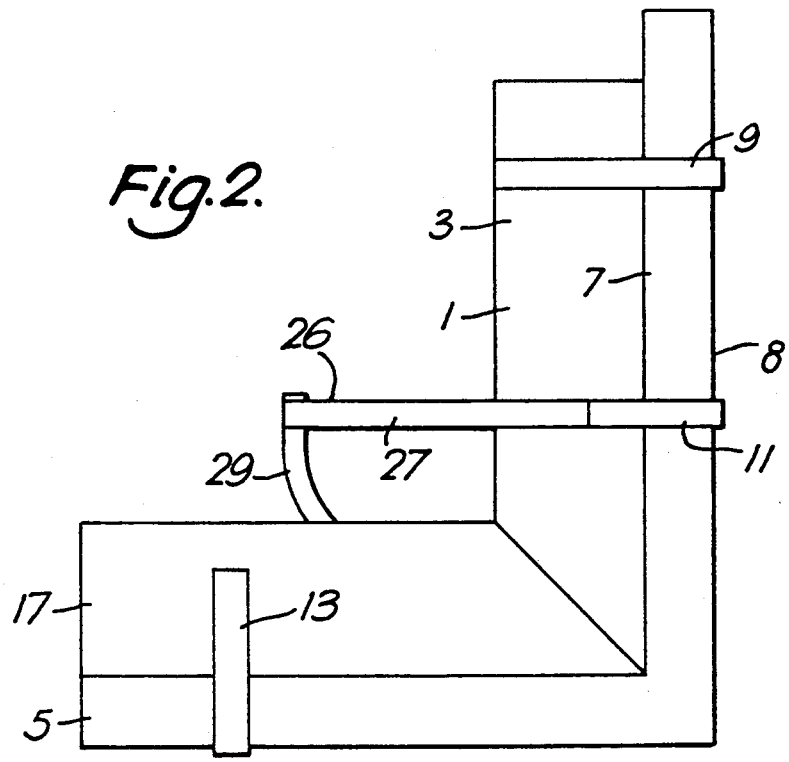
FIG. 2 is a side elevation of the child safety seat of FIG. 1.

Referring to the drawings, a child safety seat 1 comprises a seat portion 2 and a backrest portion 3 which are respectively securable to a seat 5 and backrest 7 of a chair 8 by straps 9 and 11 which are welded to the backrest portion 3 and provided with buckles (not shown) to secure the backrest part 3 to the chair backrest 7 whilst strap 13 serves to secure the seat portion 2 to the chair seat 5.

Figure 3:
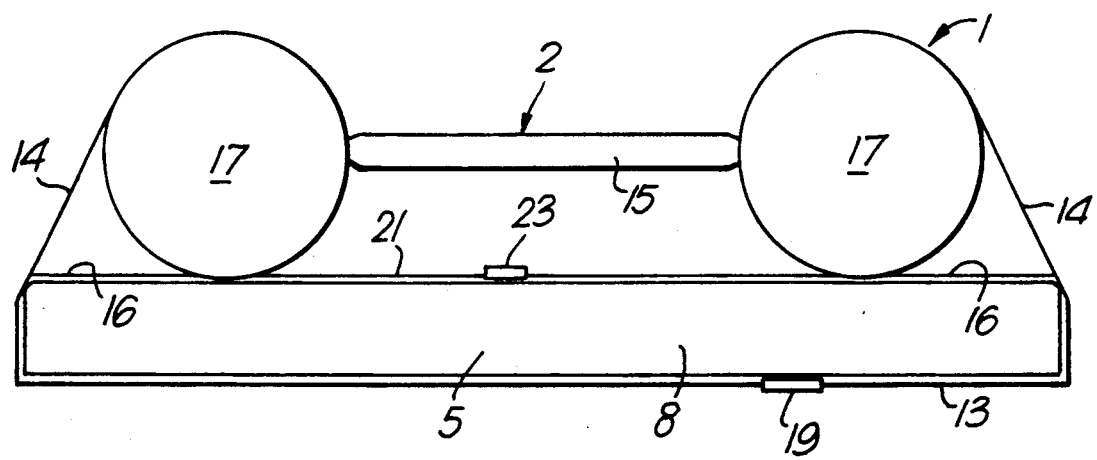
FIG. 3 is a front elevation of the seat part only of the safety seat of the other two Figures mounted on a chair seat.

The chair seat portion 2 comprises a child engaging seat part 15 having, at respective opposite sides thereof which extend from front to rear of said seat part 2, lateral restraints 17 of elongated tubular form. The strap 13 at opposite ends thereof is divided into strap parts 14 and 16 which are connected to the restraints 17 and is secured to the chair seat 5 by means of an adjusting buckle 19 (see FIG. 3). The strap parts 14 and 16 can, alternatively, comprise a separate single strap welded at its ends to the corresponding restraint 17 and engaged by a loop attached to the adjacent free end of the strap 13. The restraints 17 are preferably of inflatable tubular form and the child engaging seat part 15 is also preferably of inflatable form. Between the restraints 17 adjacent the parts thereof which engage the chair seat 5 is a further strap 21, which may be an extension of the strap parts 16 and which has an adjusting buckle 23. Adjustment of the length of the strap 21 by means of the buckle 23 effectual mutual counter rotation of the restraints 17 causing, depending on whether the strap means 21 is lengthened or shortened, lowering or raising of the child engaging seat part 15.

The backrest part 3 of the safety seat comprises a child engaging backrest part 24 and, extending along opposite upright sides of said part 24, backrest lateral restrains 25 which extend upwards from the rear ends of the restrains 17 and area also preferably of tubular form. The restrains 25 and backrest part 23 are also, further, of inflatable form.

Further provided, as is normal with child safety seats, is a child engaging harness 26 which in this case comprises a waist strap 27 attached at opposite ends thereof respectively to the restraints 25 and a crotch strap 29 attached at an end thereof to the child engaging seat part 15 between the front and rear edges thereof and to the waist strap 27 by a loop at the free end of the waist strap through which the waist strap passes.

Although the invention has been described in respect of a child safety seat having seat and backrest portions, the backrest portion may be eliminated where the child can be seated on the seat portion of the safety seat with the chair backrest serving to provide back support for the child. In such a case, plainly, the strap 27 would be a separate strap and would require to engage around the child and the back of the chair backrest.

It will be apparent to those skilled in the art that a child safety seat according to this intention, whilst preferably comprising components of inflatable form, may include many variations on the specific form thereof described with reference to the accompanying drawings. Thus, the lateral restraints 17 and, if present, 25, need not be of tubular form and need not be of inflatable form. Also, the child seat engaging part of the seat portion need not be inflatable and could, for example, be in the form of a frame carrying a child supporting lattice of straps or of basket weave. Alternatively, the parts 15 and, if present 23 could be formed of fabric or a flexible pad.

The invention provides a simple child safety seat, the seat height of which can be adjusted to suit the size of the child and/or the height of the table from which the child feeds or is fed.

I claim:

1. A child safety seat for mounting on a chair having a seat and a backrest, comprising a seat portion which in the mounted position of said safety seat engages with seat of said chair, said seat portion including a child engaging seat part and respective elongated lateral restraints extending along and secured to opposite sides of said seat part disposed in a direction from front to rear thereof, there being provided adjustable length strap means connected at respective opposite ends to said restraints whereby adjustment of the length of said strap means effects mutual counter rotation of said restraints to vary the height of said child engaging seat part.

2. A child safety seat as claimed in claim 1, characterised in that said strap means extend in use beneath said seat portion.

3. A child safety seat as claimed in claim 1 or claim 2, characterised in that said restraints are each of tubular form.

4. A child safety seat as claimed in any one of claims 1 to 3, characterised in that said restrains are each of tubular inflatable form.

5. A child safety seat as claimed in any preceding claim, characterised in that said child engaging seat part is of inflatable form.

6. A child safety seat as claimed in any preceding claim, characterised in that further strap means are provided for securing said seat part to said chair seat.

7. A child safety seat as claimed in any preceding claim, characterised in that said safety seat is provided with a backrest part which in the mounted position of said seat engages said chair backrest.

8. A child safety seat as claimed in claim 7, characterised in that said backrest part includes respective elongated lateral restraints which extend along opposite upright sides of said backrest part.

9. A child safety seat as claimed in claim 7 or claim 8, characterised in that said lateral restraints of said backrest are of tubular form.

10. A child safety seat as claimed in claim 9, characterised in that said lateral backrest restraints are of tubular inflatable form.

11. A child safety seat as claimed in any one of claims 7 to 10, characterised in that said backrest part is of inflatable form.

12. A child safety seat as claimed in any one of claims 7 to 11, characterised in that said backrest part is provided with strap means for securing said backrest part of said chair backrest.

13. A child safety seat as claimed in any preceding claim, characterised in that attached to said seat is a child restraining harness.

14. A child safety seat as claimed in any one of claims 13 or 12, characterised in that said harness comprises a waist strap attached to said backrest part and a crotch strap attached to said seat part, said crotch and waist strap being mutually coupled in use.

15. A child safety seat as claimed in claim 7, characterised in that said seat part and said backrest part are of inflatable form.

16. A child safety seat as claimed in claim 2, characterized in that said restrains are each of tubular form.

17. A child safety seat as claimed in claim 2, characterized in that said restraints are each of tubular inflatable form.

18. A child safety seat as claimed in claim 2, characterized in that said child engaging seat part is of inflatable form.

19. A child safety seat as claimed in claim 2, characterized in that further strap means are provided for securing said seat part of said chair seat.

20. A child safety seat as claimed in claim 2, characterized in that said safety seat is provided with a backrest part which in the mounted position of said seat engages said child backrest.

* * * * *